D. T. CASEMENT.
Pressure Regulators for Fluids.
No. 147,604. Patented Feb. 17, 1874.
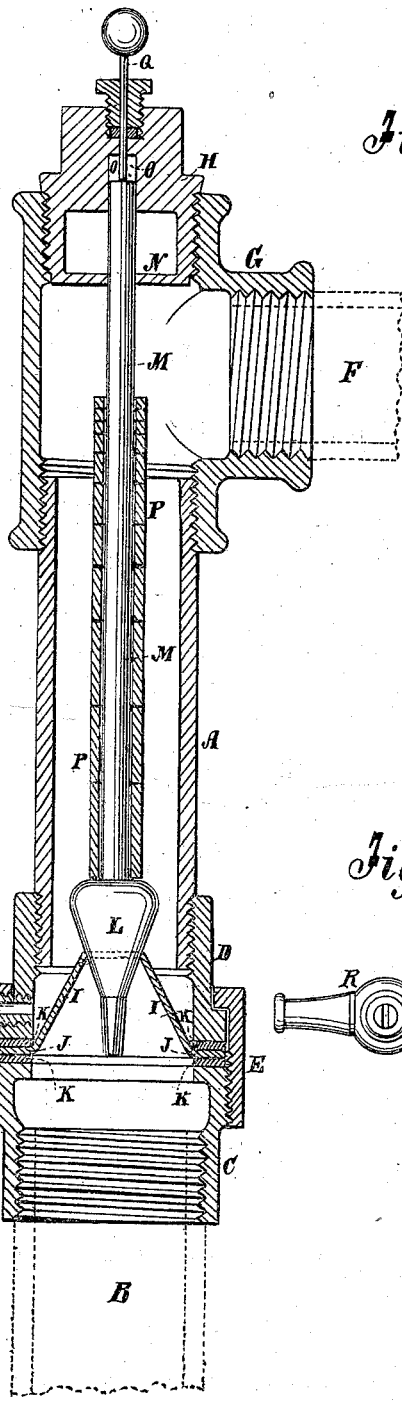
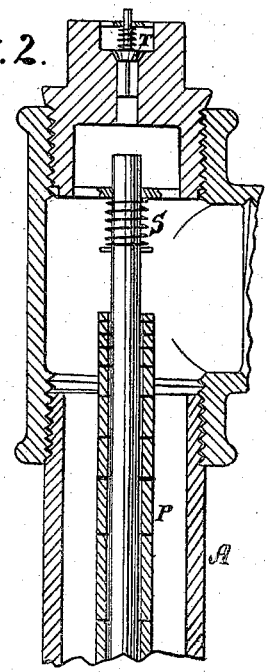
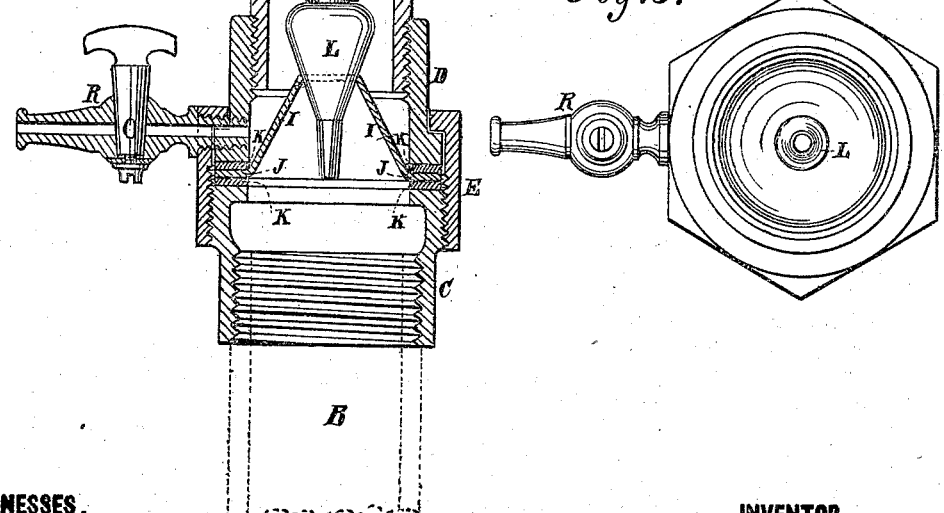
WITNESSES.
INVENTOR.
BY
ATTORNEYS.

UNITED STATES PATENT OFFICE.

DANIEL T. CASEMENT, OF PAINESVILLE, OHIO.

IMPROVEMENT IN PRESSURE-REGULATORS FOR FLUIDS.

Specification forming part of Letters Patent No. 147,604, dated February 17, 1874; application filed December 18, 1873.

*To all whom it may concern:*

Be it known that I, DANIEL THOMAS CASEMENT, of Painesville, in the county of Lake and State of Ohio, have invented a new and Improved Pressure-Regulator for Fluids, of which the following is a specification:

My invention is an improvement in pressure-regulators for fluids, as gas, compressed air, or steam; and relates to the construction of the valve-seat for the weighted valve, and the mode of securing it in the pipe-section, as hereinafter described.

Figure 1 represents a sectional elevation of my improved regulator. Fig. 2 is a part sectional elevation, showing the application of a safety-valve and spring-closer. Fig. 3 is a plan of Fig. 1 inverted.

A represents a short section of gas, water, or other pipe, as the case may require, coupled vertically and at the lower end with the well or other tube, B, coming from the source, by the couplings C D E; also, coupled horizontally at the upper end with the pipe F, going to the place of use or consumption by the T G, and closed at the top by a screw-plug, H, or a cap, if preferred. The valve-seat I is a plate, conical in form, which is cut out at the center to receive the valve L, and has its flat circular rim J clamped between the sections C and D, as shown. Packing-rings K are interposed between said rim and pipe-sections, to form a tight joint, and a cap-piece or flanged and threaded ring, E, secures the sections together, as shown. Thus it may be readily inserted in or removed from the tube A when worn, and an annular cavity is also formed around it on the upper side, into which the liquid condensed from the gas will collect in considerable quantity, without interfering with the operation of the valve or escaping downward into the lower sections of the conducting-pipe. The condensed liquid is drawn off by cock R, which is located just above the flat rim of the valve-seat N, attached to the screw-plug, and, when the push-pin is used, into a socket, O, of the plug, if preferred, the said rod being to guide the valve in its movements in opening and closing; also, to receive the weights for loading the valve, which said weights are, in this example, short tubes P, of lead or other heavy metal. Q is the push-pin.

In Fig. 2, S represents a spring, that is used in place of the push-rod of Fig. 1, for holding the valve steady; and T represents the safety-valve, which it may sometimes be desirable to use to let off any excess in case the pressure increases unduly at the source of supply.

A spring, as here shown, or a lever and weight, may be used for holding the valve closed.

For a safety-valve for a steam-boiler, the regulator will be found superior to others now in use, in that, by reason of the oblique angle of the cone, it is not liable to jump after rising from its seat, as others do, in consequence of the greater area exposed to pressure as soon as they are lifted off the seat, and will, therefore, be steadier, and the raised valve-seat will protect the valve from sediment that the other valves are subject to by lodging on them, but which, in this arrangement, falls into the space below.

It is designed to make the conical portion of the diaphragm as thin at the seat as it can be and preserve the requisite strength; also, to make it of steel and harden it, so that the surface for contact of the valve will be reduced as much as possible, to lessen the area subject to friction, and thereby lessen the action of the friction in opposition to the opening of the valve, and thus prevent sticking; besides, the smaller the area of the bearing-surface, the closer will be the contact.

Having thus described my invention, I claim as new and desire to secure by Letters Patent—

1. The conical valve-seat I, in combination with the pipe-section D and discharge-cock R, said cock being arranged at the base of the cone, as and for the purpose specified.

2. The conical valve-seat I, formed of a metal plate having a flat circular rim, in combination with the pipe-sections C and D and locking-ring E, whereby it is clamped and secured, as shown and described.

Witnesses:     DANL. T. CASEMENT.
  T. B. MOSHER,
  ALEX. F. ROBERTS.